US008209329B2

(12) United States Patent
Asai (10) Patent No.: US 8,209,329 B2
(45) Date of Patent: Jun. 26, 2012

(54) APPARATUS, METHOD, AND PROGRAM FOR INFORMATION PROCESSING

(75) Inventor: Yuki Asai, Tokyo (JP)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 12/098,554

(22) Filed: Apr. 7, 2008

(65) Prior Publication Data

US 2008/0301126 A1  Dec. 4, 2008

(30) Foreign Application Priority Data

Apr. 9, 2007 (JP) .............................. P2007-102242

(51) Int. Cl.
  *G06F 7/00* (2006.01)
(52) U.S. Cl. ...................................... 707/725; 707/777
(58) Field of Classification Search .................. None
  See application file for complete search history.

(56) References Cited

U.S. PATENT DOCUMENTS

| | | | | |
|---|---|---|---|---|
| 5,873,107 | A * | 2/1999 | Borovoy et al. | 715/234 |
| 6,778,982 | B1 * | 8/2004 | Knight et al. | 707/737 |
| 6,845,374 | B1 * | 1/2005 | Oliver et al. | 1/1 |
| 2002/0194166 | A1 * | 12/2002 | Fowler | 707/3 |
| 2005/0076051 | A1 * | 4/2005 | Carobus et al. | 707/102 |
| 2005/0165739 | A1 * | 7/2005 | Yamamoto et al. | 707/3 |
| 2006/0004850 | A1 * | 1/2006 | Chowdhury | 707/103 R |
| 2006/0074910 | A1 * | 4/2006 | Yun et al. | 707/7 |
| 2006/0095420 | A1 * | 5/2006 | Ikegami et al. | 707/3 |
| 2006/0117002 | A1 * | 6/2006 | Swen | 707/4 |
| 2006/0123348 | A1 * | 6/2006 | Ross et al. | 715/751 |
| 2006/0242554 | A1 * | 10/2006 | Gerace et al. | 715/501.1 |
| 2007/0118802 | A1 * | 5/2007 | Gerace et al. | 715/738 |
| 2007/0192310 | A1 * | 8/2007 | Takagi et al. | 707/5 |
| 2008/0275899 | A1 * | 11/2008 | Baluja et al. | 707/102 |
| 2008/0294624 | A1 * | 11/2008 | Kanigsberg et al. | 707/5 |
| 2009/0013250 | A1 * | 1/2009 | Hsieh et al. | 715/273 |

FOREIGN PATENT DOCUMENTS

| | | |
|---|---|---|
| JP | 11 66081 | 3/1999 |
| JP | 2000 29829 | 1/2000 |
| JP | 2001 312513 | 11/2001 |
| JP | 2003 242176 | 8/2003 |
| JP | 2004 362019 | 12/2004 |
| JP | 2005 115790 | 4/2005 |
| JP | 2006 228141 | 8/2006 |

* cited by examiner

*Primary Examiner* — Vei-Chung Liang
(74) *Attorney, Agent, or Firm* — Frommer Lawrence & Haug LLP; William S. Frommer; Russell P. Blaise (57) ABSTRACT

An information processor is disclosed. The processor includes: a keyword extraction portion for extracting keywords from a text created by a user; a keyword information acquisition portion for acquiring given keyword information about the keywords extracted by the keyword extraction portion; an interest degree calculation portion for finding information about degrees of interest indicating user's degrees of interest in the keywords, based on the keyword information; a keyword selection portion for selecting given keywords from the keywords extracted by the keyword extraction portion, based on the information about the degrees of interest; and a content decision portion for determining a content recommended to the user, based on the keywords selected by the keyword selection portion.

7 Claims, 10 Drawing Sheets

| DATE | TITLE | NAME OF MEMBER |
|---|---|---|
| 7/6 | RESTAURANT RESERVATION | YUHKO |
| 7/5 | NEXT WEEK'S DINNER | AKIKO |
| 7/4 | OKINAWA IS SET AS DESTINATION | YOHKO |
| 7/3 | LET'S GO TO SEA | YUHKO |
| 7/1 | SCHEDULES IN SUMMER HOLIDAY | AKIKO |

| KEYWORD | DATE | WEIGHT (POINTS) |
|---|---|---|
| RESTAURANT | 7/6 | 5 |
| RESERVATION | 7/6 | 5 |
| NEXT WEEK | 7/5 | 4 |
| DINNER | 7/5 | 4 |
| OKINAWA | 7/4 | 3 |
| SEA | 7/3 | 2 |
| SUMMER HOLIDAYS | 7/1 | 1 |
| SCHEDULE | 7/1 | 1 |

FIG. 5

| DATE | THE TEXT |
|------|----------|
| 7/6 | I HAVE CREATED A LIST OF ITALIAN RESTAURANTS. |
| 7/5 | CAN I OFFER ITALIAN FOOD AT NEXT WEEK'S DINNER? |
| 7/4 | IS OKINAWA A GOOD CHOICE? |
| 7/3 | I'D LIKE TO HAVE A SUMMER VACATION AT THE SEASIDE. |
| 7/1 | LET'S SET A SCHEDULE FOR SUMMER HOLIDAYS. |

| KEYWORD | DATE | WEIGHT |
|---------|------|--------|
| ITALIAN | 7/6 | 5 |
| SHOP | 7/6 | 5 |
| DINNER | 7/5 | 4 |
| ITALIAN | 7/5 | 4 |
| OKINAWA | 7/4 | 3 |
| SUMMER HOLIDAYS | 7/3 | 2 |
| SEA | 7/3 | 2 |
| SUMMER HOLIDAYS | 7/1 | 1 |
| SCHEDULE | 7/1 | 1 |

| KEYWORD | POINTS |
|---------|--------|
| ITALIAN | 9 (=5+4) |
| SHOP | 5 |
| DINNER | 4 |
| OKINAWA | 3 |
| SUMMER HOLIDAYS | 3 (=2+1) |
| SEA | 2 |
| SCHEDULE | 1 |

FIG. 6

| DATE | THE TEXT |
|---|---|
| 7/6 | I HAVE CREATED A LIST OF ITALIAN RESTAURANTS. |
| 7/5 | CAN I OFFER ITALIAN FOOD AT NEXT WEEK'S DINNER? |
| 7/4 | IS OKINAWA A GOOD CHOICE? OKINAWA IS FAMOUS FOR ITS OKINAWAN NOODLES. |
| 7/3 | I'D LIKE TO HAVE A SUMMER VACATION AT THE SEASIDE. |
| 7/1 | LET'S SET A SCHEDULE FOR SUMMER HOLIDAYS. |

| KEYWORD | NUMBER OF APPEARANCES | WEIGHT |
|---|---|---|
| ITALIAN | 1 | 1 |
| SHOP | 1 | 1 |
| DINNER | 1 | 1 |
| ITALIAN | 1 | 1 |
| OKINAWA | 3 | 0.5 |
| OKINAWA | 3 | 0.5 |
| OKINAWA | 3 | 0.5 |
| SUMMER HOLIDAYS | 1 | 1 |
| SEA | 1 | 1 |
| SUMMER HOLIDAYS | 1 | 1 |
| SCHEDULE | 1 | 1 |

| KEYWORD | POINTS |
|---|---|
| ITALIAN | 2 (=1×2) |
| SHOP | 1 |
| DINNER | 1 |
| OKINAWA | 1.5 (=0.5×3) |
| SUMMER HOLIDAYS | 2 (=1×2) |
| SEA | 1 |
| SCHEDULE | 1 |

FIG. 7

| I HAVE FOUND A SWEET WINE. ALTHOUGH IT'S A CALIFORNIAN WINE, IT IS CONSIDERABLY SWEET. WINE NEEDS SWEET BREAD AND CHEESE. IN ANY CASE, BAGUETTES ARE SUITED TO BREAD. ANY AVAILABLE BREAD WILL SUFFICE. WE CAN ENJOY SO MUCH ONLY IF THERE IS ANY BREAD. | | |
|---|---|---|
| KEYWORD | ORDER OF APPEARANCE | WEIGHT |
| WINE | 1 | 10 |
| CALIFORNIA | 2 | 9 |
| WINE | 3 | 8 |
| WINE | 4 | 7 |
| BREAD | 5 | 6 |
| CHEESE | 6 | 5 |
| BREAD | 7 | 4 |
| BAGUETTE | 8 | 3 |
| BREAD | 9 | 2 |
| BREAD | 10 | 1 |

| KEYWORD | POINTS |
|---|---|
| WINE | 25 (=10+8+7) |
| CALIFORNIA | 9 |
| BREAD | 13 (=6+4+2+1) |
| CHEESE | 5 |
| BAGUETTE | 3 |

FIG. 8

| DATE | THE TEXT | WEIGHT ACCORDING TO DATE (AS OF 7/13) | WEIGHT ACCORDING TO DATE (AS OF 7/15) | WEIGHT ACCORDING TO ORDER OF APPEARANCE |
|---|---|---|---|---|
| 7/14 | I HAVE SEEN THE MOVIE. ISN'T IT "PLEASE CATCH IT IN A WINE FIELD"? THE MOVIE IS A HIGHLY RECOMMENDED ONE OF RECENT MOVIES. | | MOVIE 5<br>WINE 5<br>FIELD 5<br>MOVIE 5 | MOVIE 10<br>WINE 9<br>FIELD 8<br>MOVIE 7 |
| 7/13 | THAT'S RIGHT. THERE IS A MOVIE SHOT IN THAT WINERY. HAVE YOU EVER SEEN THIS MOVIE? | | WINERY 4<br>MOVIE 4<br>MOVIE 4 | WINERY 10<br>MOVIE 9<br>MOVIE 8 |
| 7/12 | I KNOW THE WINE. IS IT A WINE FROM THE WINERY OF MOVIE DIRECTOR COPPOLA? | WINE 5<br>MOVIE 5<br>DIRECTOR 5<br>WINERY 5<br>WINE 5 | WINE 3<br>MOVIE 3<br>DIRECTOR 3<br>WINERY 3<br>WINE 3 | WINE 10<br>MOVIE 9<br>DIRECTOR 8<br>WINERY 7<br>WINE 6 |
| 7/11 | I HAVE FOUND A SWEET WINE. ALTHOUGH IT'S A CALIFORNIAN WINE, IT IS CONSIDERABLY GOOD. I'D LIKE TO FIND A GOOD CHEESE, TOO. | WINE 4<br>CALIFORNIA 4<br>WINE 4<br>CHEESE 4 | WINE 2<br>CALIFORNIA 2<br>WINE 2<br>CHEESE 2 | WINE 10<br>CALIFORNIA 9<br>WINE 8<br>CHEESE 7 |

| KEYWORD | POINTS |
|---|---|
| WINE | 152 (=5×10+5×6+4×10+4×8) |
| MOVIE | 45 (=5×9) |
| DIRECTOR | 40 (=5×8) |
| WINERY | 35 (=5×7) |
| CALIFORNIA | 36 (=4×9) |
| CHEESE | 28 (=4×7) |

| KEYWORD | POINTS |
|---|---|
| MOVIE | 180 (=5×10+5×7+4×9+4×8+3×9) |
| WINE | 129 (=5×9+3×10+3×6+2×10+2×8) |
| FIELD | 40 (=5×8) |
| WINERY | 61 (=4×10+3×7) |
| DIRECTOR | 24 (=3×8) |
| CALIFORNIA | 18 (=2×9) |
| CHEESE | 14 (=2×7) |

FIG. 9

APPARATUS, METHOD, AND PROGRAM FOR INFORMATION PROCESSING

CROSS REFERENCE TO RELATED APPLICATION

The present invention contains subject matter related to Japanese Patent Application JP2007-102242 filed in the Japanese Patent Office on Apr. 9, 2007, the entire contents of which being incorporated herein by reference.

BACKGROUND OF THE INVENTION

1. Field of the Invention

The present invention relates to apparatus, method, and program for information processing and, more particularly, to apparatus, method, and program permitting a content associated with items in which a user is more interested to be recommended to the user.

2. Description of the Related Art

One already developed method of determining a content recommended to a user from an exorbitant number of contents includes extracting keywords in which the user is strongly interested and making the recommendation based on the keywords.

For example, there is a method of determining a content recommended to a user by extracting interest keywords in which the user is interested based on history information about selection of contents by the user and determining the recommended content based on the interest keywords (see, for example, JP-A-2000-29892).

However, in this related-art method, keywords used for determination of contents are selected based on user's instructions from a list presented by an apparatus or extracted from a text including SI (service information) or G-Guide™ information attached to contents which are viewed and listened to or for which videotape reservations are made.

That is, in the related-art method, keywords used for determination of contents are extracted from the text presented by the content providers. Therefore, there is the possibility that the range of contents recommended to users is eventually determined by the intents of the content providers. That is, the range is restricted.

SUMMARY OF THE INVENTION

It is desirable to provide apparatus, method, and program permitting contents associated with items in which a user is more intensively interested to be recommended to the user.

An information processor according to one embodiment of the present invention has: a keyword extraction portion for extracting keywords from a text created by a user; a keyword information acquisition portion for acquiring given keyword information about the keywords extracted by the keyword extraction portion; an interest degree calculation portion for finding information about degrees of interest indicating user's degrees of interest in the keywords, based on the keyword information; a keyword selection portion for selecting given keywords from the keywords extracted by the keyword extraction portion, based on the information about the degrees of interest; and a content decision portion for determining a content recommended to the user, based on the keywords selected by the keyword selection portion.

The text is made up of plural items. The information processor according to one embodiment of the present invention further includes a text acquisition portion for acquiring a text of a given item of the plural items constituting the text. The keyword extraction portion extracts keywords from the text of the item acquired by the text acquisition portion. The keyword information acquisition portion can acquire information indicating the kind of the item, from which the keywords have been extracted by the keyword extraction portion, as the keyword information.

A program for causing a computer to perform an information processing method or information processing in accordance with one embodiment of the present invention includes the steps of: extracting keywords from a text created by a user; acquiring given keyword information about the keywords extracted by processing of the extracting step; finding interest degree information indicating user's degrees of interest in the keywords, based on the keyword information; selecting given keywords from the keywords extracted by processing of the extracting step, based on the interest degree information; and determining a content recommended to the user, based on the keywords selected by processing of the selecting step.

In one embodiment of the present invention, keywords are extracted from a text created by a user. Given keyword information about the extracted keywords is acquired. Interest degree information indicating user's degrees of interest in the keywords is found, based on the keyword information. Given keywords are selected from the keywords extracted by the keyword extraction portion, based on the interest degree information. A content recommended to the user is determined based on the selected keywords.

According to the embodiments of the invention, contents, for example, associated with items in which the user is more intensively interested can be recommended to the user.

DESCRIPTION OF THE PREFERRED EMBODIMENTS

Embodiments of the present invention are hereinafter described. The relationships between the constituent components of the present invention and the embodiments described in the specification or shown in the drawings are as follows. The description is intended to confirm that embodiments supporting the present invention are described in the specification or drawings. Accordingly, if there is any embodiment that is not described herein as an embodiment which is described in the specification or drawings and corresponds to constituent components of the present invention, it does not mean that the embodiment fails to correspond to the constituent components. Conversely, if there is any embodiment described herein as one corresponding to the constituent components, it does not mean that the embodiment fails to correspond to constituent components other than those constituent components.

An information processor according to an embodiment of the present invention has: a keyword extraction portion (such as a keyword extraction portion 32 of FIG. 1) for extracting keywords from a text created by a user; a keyword information acquisition portion (such as a keyword information acquisition portion 33 of FIG. 1) for acquiring given keyword information about the keywords extracted by the keyword extraction portion; an interest degree calculation portion (such as an interest degree calculation portion 34 of FIG. 1) for finding information about degrees of interest indicating user's degrees of interest in the keywords, based on the keyword information; a keyword selection portion (such as a keyword selection portion 35 of FIG. 1) for selecting given keywords from the keywords extracted by the keyword extraction portion, based on the information about the degrees of interest; and a content decision portion (such as a content determination portion 36 of FIG. 1) for determining a content recommended to the user, based on the keywords selected by the keyword selection portion.

The text is made up of plural items. The information processor according to the embodiment of the present invention further includes a text acquisition portion (such as an extracted text acquisition portion 31 of FIG. 1) for acquiring a text of given items of the plural items constituting the text. The keyword extraction portion extracts keywords from the text of the items acquired by the text acquisition portion. The keyword information acquisition portion can acquire information indicating the kinds of the items, from which keywords have been extracted by the keyword extraction portion, as the keyword information.

Figure 2:
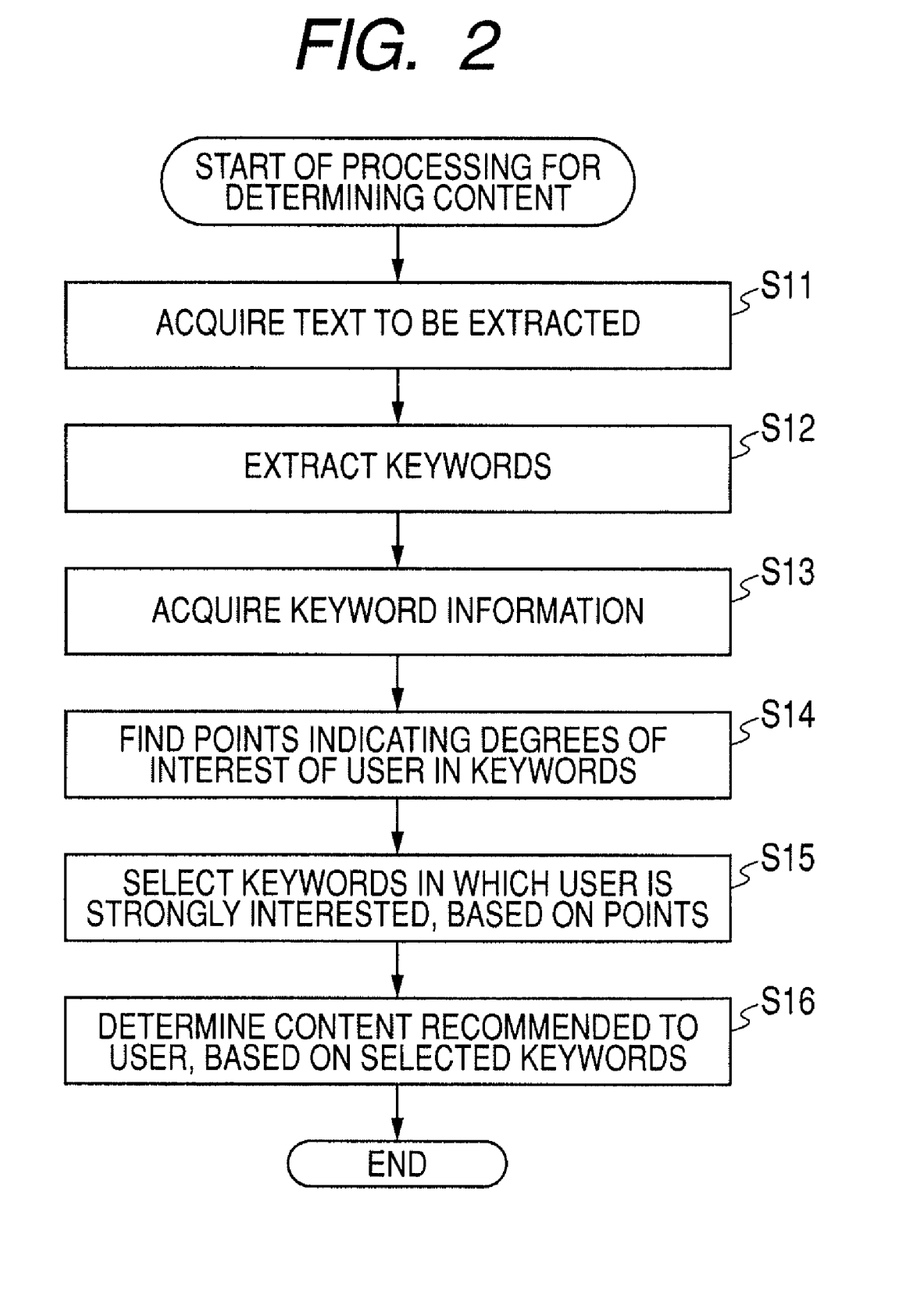
FIG. 2 is a flowchart illustrating processing performed by a content decision portion 12 to determine a content.

A program for causing a computer to perform an information processing method or information processing in accordance with an embodiment of the present invention includes the steps of: extracting keywords from a text created by a user (such as step S12 of FIG. 2); acquiring given keyword information about the keywords extracted by processing of the extracting step (such as step S13 of FIG. 2); finding interest degree information indicating user's degrees of interest in the keywords, based on the keyword information (such as step S14 of FIG. 2); selecting given keywords from the keywords extracted by processing of the extracting step, based on the interest degree information (such as step S15 of FIG. 2); and determining a content recommended to the user, based on the keywords selected by processing of the selecting step (such as step S16 of FIG. 2).

Embodiments of the present invention are hereinafter described with reference to the drawings.

Figure 1:
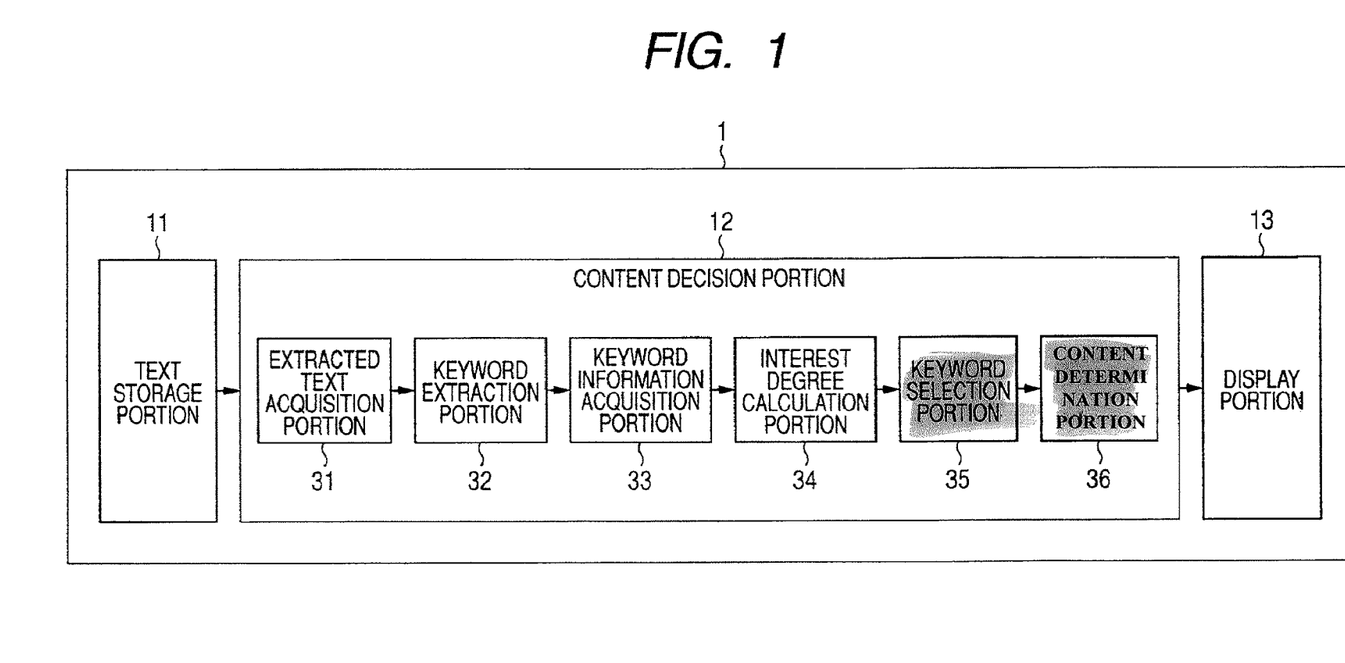
FIG. 1 is a block diagram showing an example of configuration of an information processor according to one embodiment of the present invention.

FIG. 1 is a block diagram showing an example of configuration of an information processor 1 utilizing one embodiment of the present invention.

The information processor 1 determines a content recommended to a user, for example, based on a text created by the user of the information processor 1, and provides information about the determined content to the user.

The information processor 1 includes a text storage portion 11, a content decision portion 12, and a display portion 13.

Where the information processor 1 is a cell phone or personal computer, for example, and can communicate with other terminal via the Internet, the text storage portion 11 acquires and stores messages such as emails destined for the user of the information processor 1 and information (hereinafter may be referred to as text information) about text of messages created by the user of the information processor 1 according to circumstances.

The content decision portion 12 performs processing for determining a content, i.e., reads out text information stored in the text storage portion 11, selects given keywords from keywords extracted from given text in the text information read out, and determines the content recommended to the user, based on the selected given keywords. The decision portion supplies information about the obtained content recommended to the user to the display portion 13.

The display portion 13 displays the information about the content supplied from the content decision portion 12. For example, where the content is a program B of channel A, the display portion 13 displays "Today's recommended program: program B of channel A, . . . " on a display screen (not shown).

An example of configuration of the content decision portion 12 is next described. The content decision portion 12 is configured including an extracted text acquisition portion 31, a keyword extraction portion 32, a keyword information acquisition portion 33, an interest degree calculation portion 34, a keyword selection portion 35, and a content determination portion 36.

The extracted text acquisition portion 31 reads out text information stored in the text storage portion 11, acquires given text (e.g., title or text of a message) in the text information read out as an extracted text, and supplies the acquired text to the keyword extraction portion 32. Furthermore, the extracted text acquisition portion 31 acquires information (e.g., the date of the message) used for acquisition of keyword information according to circumstances and attaches the acquired information to the extracted text.

The keyword extraction portion 32 performs a morphological analysis, for example, of the extracted text supplied from the extracted text acquisition portion 31 to thereby extract given words as keywords from the extracted text. The extracted keywords are supplied to the keyword information acquisition portion 33.

The keyword information acquisition portion 33 acquires the given keyword information about the keywords supplied from the keyword extraction portion 32, for example, by analyzing either the extracted text from which the keywords are extracted or information attached to the extracted text and supplying the keyword information to the interest degree calculation portion 34.

The interest degree calculation portion 34 finds points that provide information about the user's degrees of interest in the keywords corresponding to the keyword information, based on the keyword information supplied from the keyword information acquisition portion 33, and supplies the found points to the keyword selection portion 35.

The keyword selection portion 35 selects keywords resulting in top three points, for example, of the points supplied from the interest degree calculation portion 34, i.e., keywords in which the user is intensively interested, and supplies the selected keywords as given keywords to the content determination portion 36.

The content determination portion 36 determines broadcast contents having metadata including the keywords, for example, based on the keywords supplied from the keyword selection portion 35 as keywords recommended to the user, and supplies information about the contents such as channels and program titles of the determined contents to the display portion 13.

FIG. 2 is a flowchart illustrating processing for determining contents, the processing being performed by the content decision portion 12.

The processing for determining the contents is started, for example, at given intervals of time or whenever a given amount of text is stored in the text storage portion 11.

It is assumed that text information including given text that can be an extracted text has been previously stored in the text storage portion 11.

In step S11, text information is read from the text storage portion 11 by the extracted text acquisition portion 31. The given text in the text information read out is acquired as an extracted text.

In step S12, keywords are extracted from the acquired extracted text by the keyword extraction portion 32.

In step S13, the given keyword information about the extracted keywords is acquired by the keyword information acquisition portion 33.

In step S14, the interest degree calculation portion 34 finds points indicating the degrees of interest of the user in the keywords corresponding to the keyword information, based on the acquired keyword information.

In step S15, the keyword selection portion 35 selects given keywords from the extracted keywords, based on the found points.

In step S 16, the content determination portion 36 determines a content recommended to the user, based on the selected keywords. Information about the determined content is supplied to the display portion 13. When the content recommended to the user is determined in this way, the processing for determining a content is terminated.

A specific example of the processing for determining a content in a case where messages exchanged between plural members including the user of the information processor 1, for example, in a message exchange site is next described by referring to FIGS. 4-8.

Figure 3:
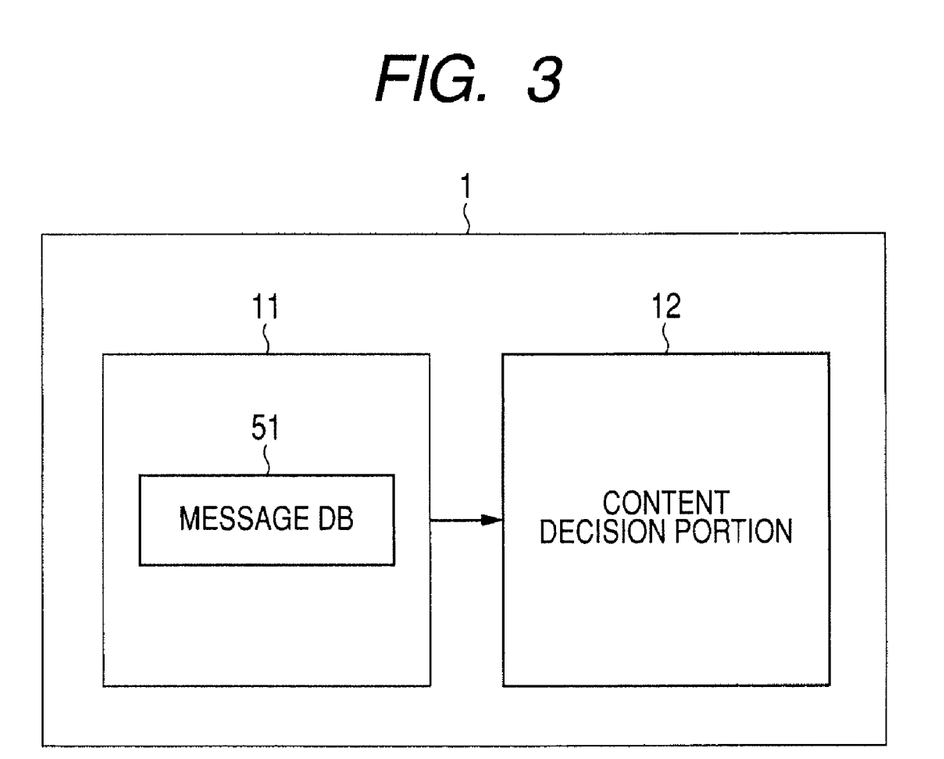
FIG. 3 is a block diagram showing another example of configuration of the information processor according to one embodiment of the invention.

In this example, a message DB (database) 51 in which messages exchanged between the plural members are stored is formed in the text storage portion 11 as shown in FIG. 3.

A specific example of the processing for determining a content is first described with reference to the example of FIG. 4.

Usually, user's interest or concern varies with the elapse of time. For example, messages created 1 day before and exchanged more often contain items in which the user is presently interested than messages created 1 week before and exchanged. That is, it is considered that the user is more interested in keywords extracted from messages created at instants of time closer in time to the present instant of time.

Figure 4:
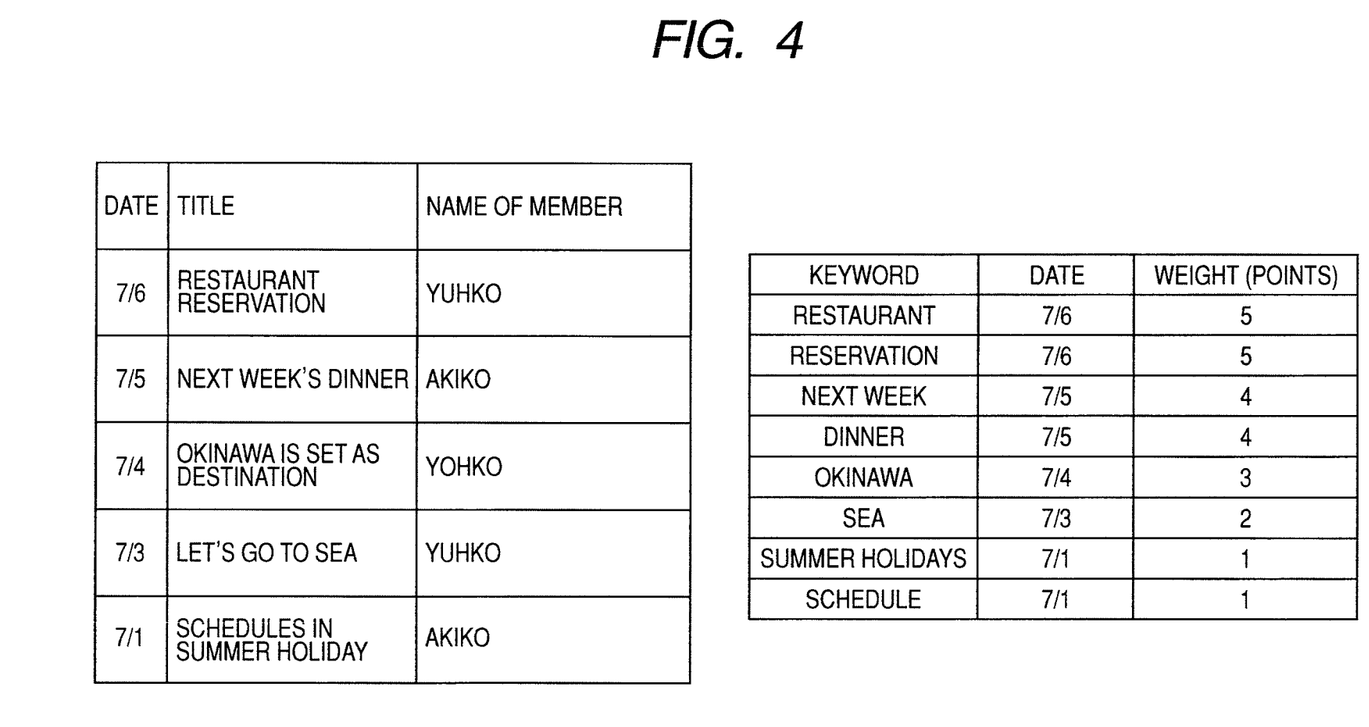
FIG. 4 shows lists illustrating specific examples of processing for determining contents.

Accordingly, in the example of FIG. 4, a higher weight is attached to a keyword extracted from a message corresponding to the time at which the message was created, e.g., a message having a date closer in time to the present instant of time.

First, as shown in the left part of FIG. 4, captions (or, brief explanations) of the titles "restaurant reservation", "next week's dinner", "Okinawa is set as destination", "Let's go to sea", and "schedules in summer holidays" are acquired as extracted text from messages. Information about the dates of the messages and senders (members) of the messages is attached to the extracted text (step S11).

Then, as shown in the right portion of FIG. 4, "restaurant" and "reservation" are extracted as keywords from the extracted text "restaurant reservation". "Next week" and "dinner" are extracted as keywords from the extracted text "next week's dinner". "Okinawa" is extracted as a keyword from the extracted text "Okinawa is set as destination". "Sea" is extracted as a keyword from the extracted text "Let's go to sea". "Summer holidays" and "schedule" are extracted as keywords from the extracted text "schedules in summer holidays" (step S12).

Then, the dates (7/6, 7/6, 7/5, 7/5, 7/4, 7/3, 7/1, 7/1) of messages from which keywords "restaurant", "reservation", "next week", "dinner", "Okinawa", "sea", "summer holidays", and "schedules" as shown in the right part of FIG. 4 have been extracted are acquired as keyword information about the keywords (step S13).

Then, a higher weight is attached to a keyword extracted from a message having a date closer in time to the present instant of time. The weights of the keywords are found as points for the keywords (step S14).

For example, the weight of a keyword extracted from the latest message is set to 5. Weights are assigned such that a next lighter weight is given to a message having a next older date. In this way, the points for the keywords are found.

In the example of FIG. 4, if it is assumed that the present date is 7/7, the weights given to keywords "restaurant" and "reservation" extracted from the latest message having a date of 7/6 are set to 5 as shown in the right part of FIG. 4. The weights given to keywords "next week" and "dinner" extracted from the message having a date of 7/5 next closest to the present instant of time are set to 4. The weight given to keyword "Okinawa" extracted from a message having a date of 7/4 third closest to the present instant of time is set to 3. The weight given to keyword "sea" extracted from a message having a date of 7/3 fourth closest to the present instant of time is set to 2. The weights given to keywords "summer holidays" and "schedule" extracted from messages having a date of 7/1 fifth closest to the present instant of time are set to 1.

The weights to the keywords are found as points for the keywords.

After the points for the keywords are found in this way, keywords resulting in top three points, for example, are selected as keywords in which the user is interested (step S15). Based on the selected keywords, a content recommended to the user is determined (step S16).

In this way, the processing for determining a content is performed. A content recommended to the user is determined.

That is, in the example of FIG. 4, the user's interest is shifting from items of summer holidays to items of dinners. Because the weights given to keywords extracted from messages having dates closer in time to the present instant of time are set higher, the points for the keywords "restaurant", "reservation", "next week", and "dinner" regarding a dinner in which the user is presently interested can be set higher than the points for the keywords "Okinawa", "sea", "summer holidays", and "schedule" regarding summer holidays in which the user was formerly interested. As a result, a content recommended to the user can be determined based on keywords associated with items in which the user is presently interested. Consequently, a content associated with items in which the user is more interested can be recommended to the user.

Figure 5:
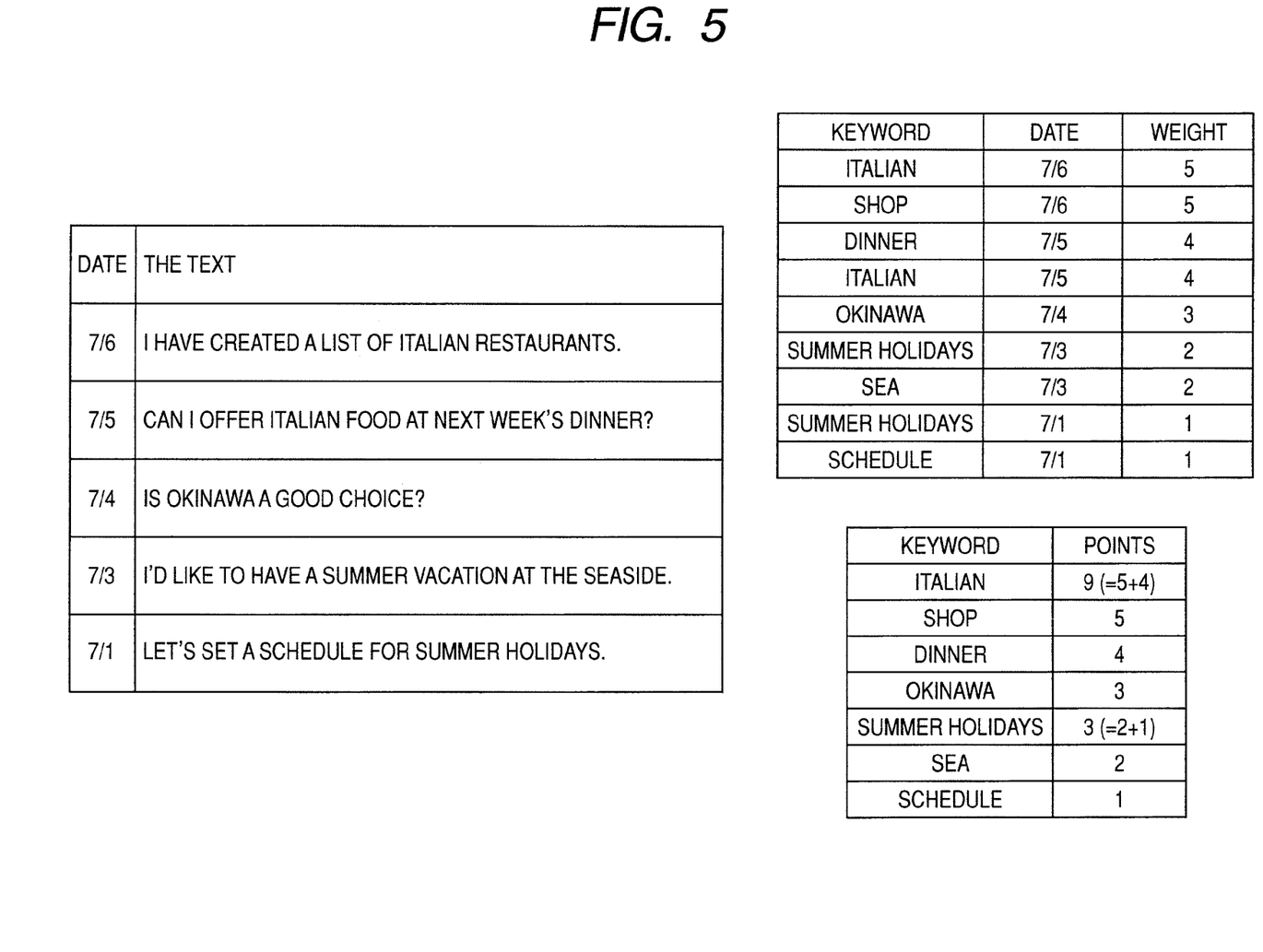
FIG. 5 shows lists illustrating specific examples of processing for determining contents.

Another specific example of the processing for determining a content is next described by referring to the example of FIG. 5.

In some cases, a user is strongly interested in a keyword appearing plural times, for example, in exchanged messages.

Accordingly, in the example of FIG. 5, weights are attached such that higher points are given to keywords appearing plural times.

First, as shown in the left part of FIG. 5, texts of the bodies of messages "I have created a list of Italian restaurants", "Can I offer Italian food at next week's dinner?", "Is Okinawa a good choice?", "I'd like to have a summer vacation at the seaside", and "Let's set a schedule for summer holidays" are acquired as extracted texts from the messages. The dates of the messages are attached to the extracted text (step S11).

Then, as shown in the right upper part of FIG. 5, "Italian" and "shop" are extracted as keywords from the extracted text "I have created a list of Italian restaurants." "Dinner" and "Italian" are extracted as keywords from the extracted text "Can I offer Italian food at next week's dinner?". "Okinawa" is extracted as a keyword from the extracted text "Is Okinawa a good choice?". "Summer holidays" and "sea" are extracted as keywords from the extracted text "I'd like to have a summer vacation at the seaside." "Summer holidays" and "schedule" are extracted as keywords from the extracted text "Let's set a schedule for summer holidays." (step S12).

Dates 7/6, 7/6, 7/5, 7/5, 7/4, 7/3, 7/3, 7/1, and 7/1 of messages from which keywords "Italian", "shop", "dinner", "Italian", "Okinawa", "summer holidays", "sea", "summer holidays", and "schedule" are extracted as shown in the right upper part of FIG. 5 are then acquired as keyword information about the keywords (step S13).

Then, in the same way as in the case of the example of FIG. 4, the weight given to the keyword extracted from the latest message is set to 5, for example. Weights are attached such that successively older messages have weights decremented by one.

In the example of FIG. 5, if the present date is 7/7, the weights given to keywords "Italian" and "shop" extracted from the latest message having a date of 7/6 as shown in the right upper part of FIG. 5 are set to 5. The weights given to keywords "dinner" and "Italian" extracted from a message having a date of 7/5 next closest in time to the present instant of time are set to 4. The weight given to keyword "Okinawa" extracted from a message having a date of 7/4 third closest in time to the present instant of time is set to 3. The weights given to keywords "summer holidays" and "sea" extracted from a message having a date of 7/3 fourth closest in time to the present instant of time are set to 2. The weights given to keywords "summer holidays" and "schedule" extracted from a message having a date of 7/1 fifth closest to the present instant of time are set to 1.

When weights are attached to keywords in this way, the weights are totalized for each word, and points for each keyword are found (step S14).

In the example of FIG. 5, the weights given to the keywords "Italian" and "summer holidays" each appearing plural times as shown in the right lower part of FIG. 5 are totalized for each word. The points for the keywords "Italian" and "summer holidays" are found to be 9 (=5+4) and 3 (=2+1), respectively. With respect to keywords "shop", "dinner", "Okinawa", "sea", and "schedule" each appearing only once, the weights given to the keywords are set to points of 5, 4, 3, 2, and 1 for the keywords, respectively.

When the points for the keywords are found in this way, keywords resulting in top three points, for example, are selected as keywords in which the user is interested (step S15). Based on the selected keywords, a content recommended to the user is determined (step S16).

The processing for determining a content is performed in this way. The content recommended to the user is determined in this manner.

That is, in the example of FIG. 5, when keywords of the same word are extracted plural times, weights are given to the keywords. The weights are totalized for the keywords of the word. The resulting weight is used as points for the keywords of the word. Therefore, the points for the keyword "Italian" appearing two times can be set higher than the points for the keyword "shop" which appears only once in the extracted text where the keyword "Italian" also appears. Consequently, a content recommended to the user can be determined, based on a keyword associated with items in which the user seems to be more interested. Hence, a content associated with items in which the user is more interested can be recommended to the user.

Figure 6:
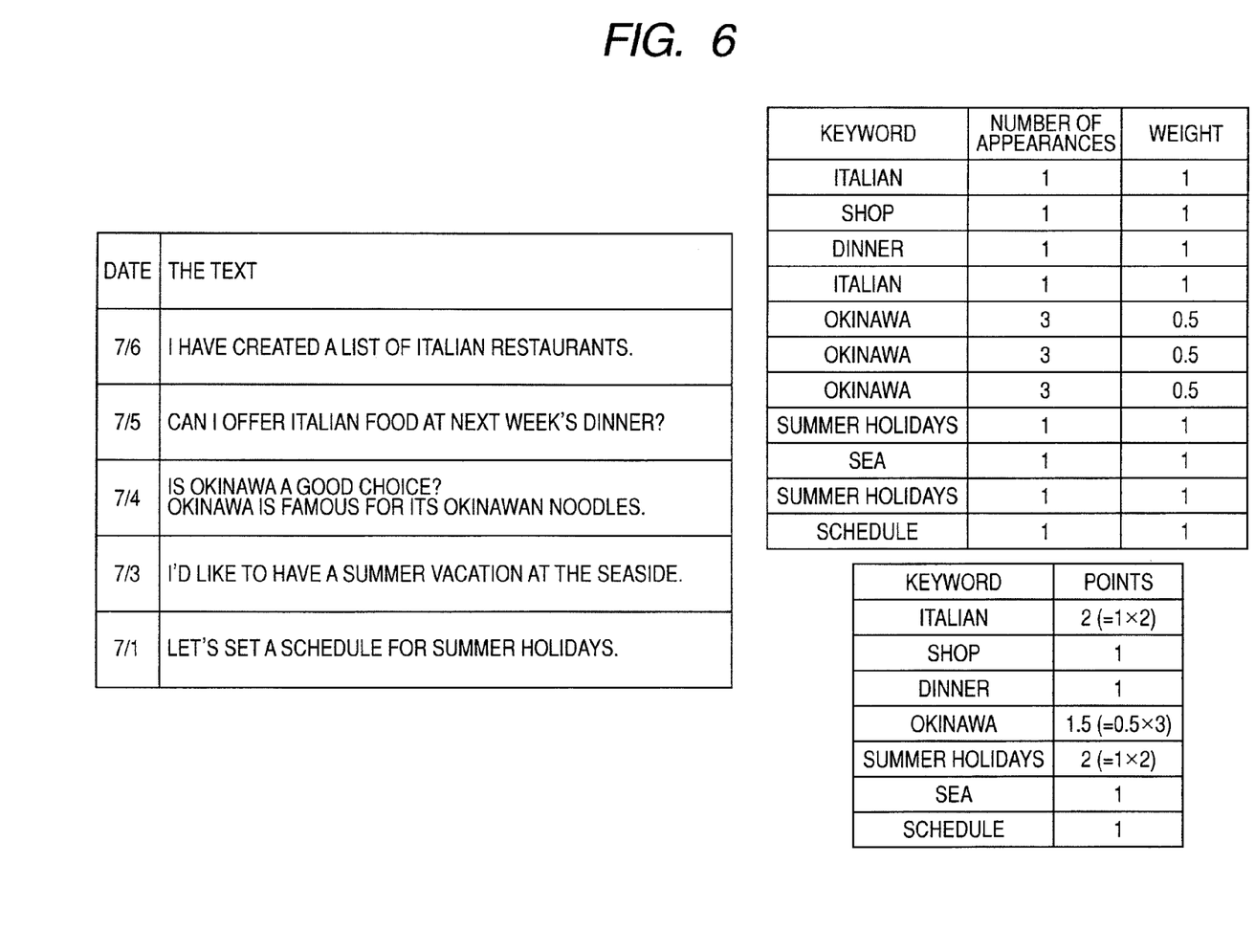
FIG. 6 shows lists illustrating specific examples of processing for determining contents.

A further specific example of the processing for determining a content is next described by referring to the example of FIG. 6.

As mentioned previously, it is considered that a user is strongly interested in words each appearing plural times in exchanged messages. In some cases, as in the example of FIG. 5, the same keyword appears plural times in one extracted text rather than appears plural times in different extracted texts. At this time, if the same weight is attached to keywords each appearing plural times as in the example of FIG. 5, the points may become too high compared with points for other keywords.

Accordingly, in the example of FIG. 6, a given small weight is attached to keywords which appear more than a given number of times in one extracted text.

First, texts of the bodies of messages as shown in the left part of FIG. 6, i.e., "I have created a list of Italian restaurants.", "Can I offer Italian food at next week's dinner?", "Is Okinawa a good choice? Okinawa is famous for its Okinawan noodles.", "I'd like to have a summer vacation at the seaside.", and "Let's set a schedule for summer holidays." are acquired as extracted texts. The dates of the messages are attached to the extracted text (step S11).

Then, as shown in the right upper part of FIG. 6, "Italian" and "shop" are extracted as keywords from the extracted text "I have created a list of Italian restaurants." "Dinner" and "Italian" are extracted as keywords from the extracted text "Can I offer Italian food at next week's dinner?". "Okinawa", "Okinawa", and "Okinawa" are extracted as keywords from the extracted text "Is Okinawa a good choice? Okinawa is famous for its Okinawan noodles." "Summer holidays" and "sea" are extracted as keywords from the extracted text "I'd like to have a summer vacation at the seaside." "Summer holidays" and "schedule" are extracted as keywords from the extracted text "Let's set a schedule for summer holidays." (step S12).

Then, the number of appearances 1, 1, 1, 1, 3, 3, 3, 1, 1, 1, and 1 of keywords "Italian", "shop", "dinner", "Italian", "Okinawa", "Okinawa", "Okinawa", "summer holidays", "sea", "summer holidays", and "schedule" in one extracted text as shown in the right upper part of FIG. 6 are acquired as keyword information about the keywords (step S13).

Then, a given small weight is attached to each keyword appearing, for example, more than a given number of times in one extracted text.

In the example of FIG. 6, as shown in the right upper part of FIG. 6, the weight given to each keyword appearing once in one extracted text is set to 1. The weight given to each keyword appearing twice or more in one extracted text is set to 0.5. That is, the weights given to the keywords "Italian", "shop", "dinner", "Italian", "Okinawa", "Okinawa", "Okinawa", "summer holidays", "sea", "summer holidays", and "schedule" are set to 1, 1, 1, 1, 0.5, 0.5, 0.5, 1, 1, 1, and 1, respectively.

When a weight is attached to each keyword in this way, weights are totalized for each word. Points for each keyword are found (step S14).

In the example of FIG. 6, as shown in the right lower part of FIG. 6, the weights given to keywords "Italian", "Okinawa", and "summer holidays" each appearing plural times are totalized for the same word. Points for the keywords "Italian", "Okinawa", and "summer holidays" are found to be 2 (=1×2), 1.5 (=0.5×3), and 2 (=1×2), respectively. With respect to keywords "shop", "dinner", "sea", and "schedule" each appearing only once, the weights given to the keywords are used as the points (1, 1, 1, 1) for the keywords.

When the points for the keywords are found in this way, keywords resulting in top three points, for example, are selected as keywords in which the user is interested (step S15). Based on the selected keyword, a content recommended to the user is determined (step S16).

The processing for determining a content is performed in this way. The content recommended to the user is determined.

That is, in the example of FIG. 6, a smaller weight is attached to each keyword appearing plural times in one extracted text than weights attached to each keyword appearing only once in one extracted text. Therefore, points for the keyword "Okinawa" appearing three times in one extracted text are set lower than points for the keywords "Italian" and "summer holidays" each appearing twice, for example, in different extracted texts. This can prevent points for keywords each appearing plural times in one extracted text from becoming too high.

In other words, it is considered that the keywords "Italian" and "summer holidays" appearing repetitively, for example, in different extracted texts are keywords in which the user is continually interested rather than the keyword "Okinawa" appearing repetitively in the same and one extracted text. Therefore, by attaching weights as described above, points for keywords in which the user is continually interested can be set higher than points for keywords each appearing repetitively in the same extracted text.

As a result, a content recommended to the user can be determined, based on keywords associated with items in which the user seems to be more interested. In consequence, a content associated with items in which the user is more interested can be recommended to the user.

Figure 7:
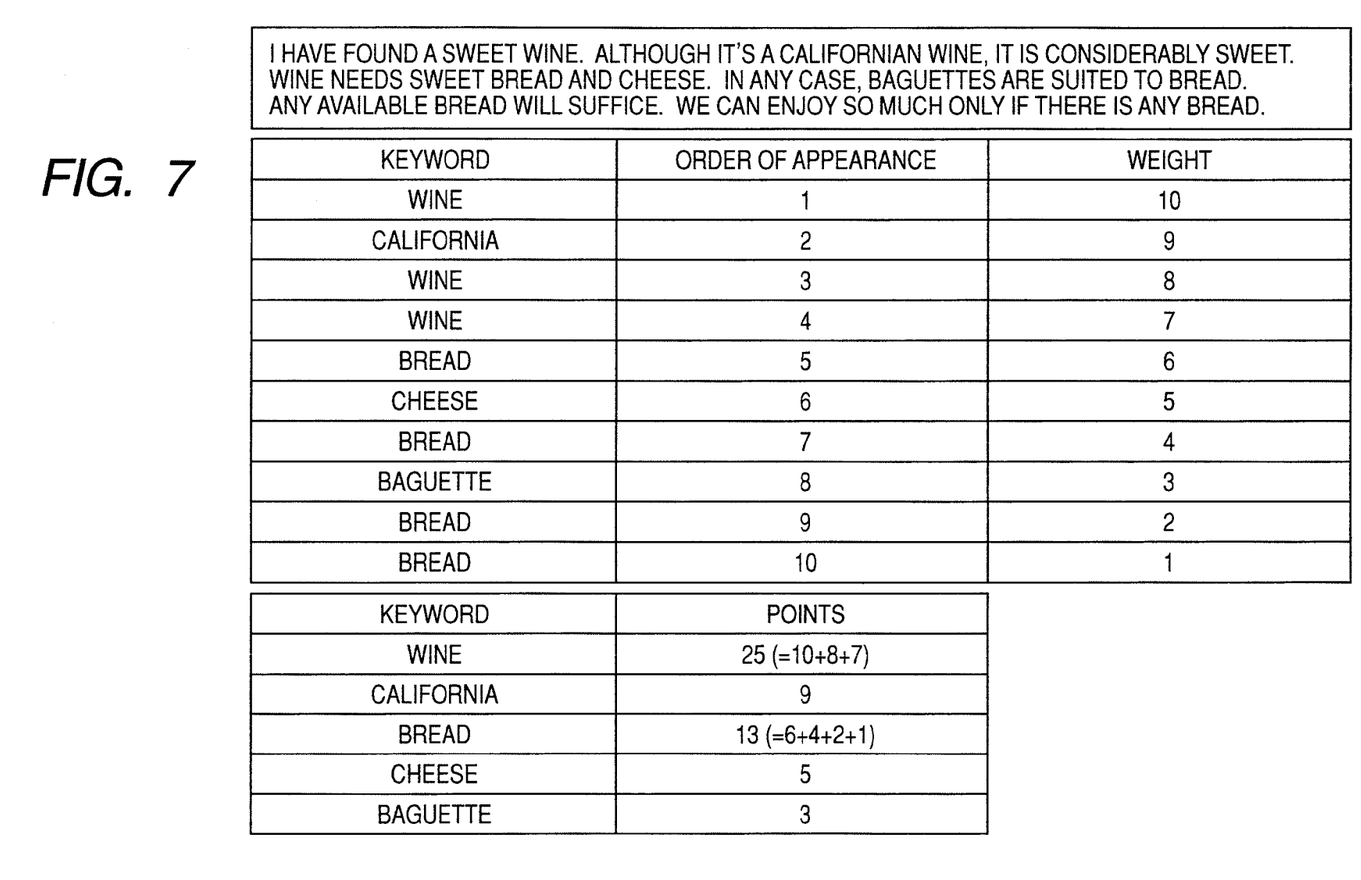
FIG. 7 shows lists illustrating specific examples of processing for determining contents.

A still other specific example of the processing for determining a content is next described by referring to the example of FIG. 7.

It is also considered that the user is greatly interested in a keyword which is closer to the head position of an extracted text within this text, and vice versa.

Accordingly, in the example of FIG. 7, a higher weight is attached to a keyword that is closer to the head position of an extracted text within this text, i.e., appears earlier in the extracted text.

First, as shown at the top of FIG. 7, text "I have found a sweet wine. Although it's a Californian wine, it is considerably sweet. Wine needs sweet bread and cheese. In any case, baguettes are suited to bread. Any available bread will suffice. We can enjoy so much only if there is any bread." of the body of a message is derived as an extracted text (step S11).

Then, as shown in the second part as viewed from the top of FIG. 7, "wine", "California", "wine", "wine", "bread", "cheese", "bread", "baguette", "bread", and "bread" are extracted as keywords from this extracted text (step S12).

Then, as shown in the second part as viewed from the top of FIG. 7, the orders (1, 2, 3, 4, 5, 6, 7, 8, 9, and 10) in which the keywords "wine", "California", "wine", "wine", "bread", "cheese", "bread", "baguette", "bread", and "bread" appear in the extracted text are obtained as keyword information about the keywords (step S13).

Then, a higher weight is attached to each keyword appearing in the extracted text, for example, in an earlier order.

For example, a weight of 10 is attached to a keyword appearing in the extracted text in the earliest order. The weight is decremented with increasing the order of appearance. That is, the weight is reduced by 1 when the order is increased by 1 (i.e., appears later).

That is, in the example of FIG. 7, as shown in the second part as viewed from the top of FIG. 7, a weight of 10 is attached to keyword "wine" having an order of appearance of 1. A weight of 9 is attached to keyword "California" having an order of appearance of 2. Similarly, weights of 8, 7, 6, 5, 4, 3, 2, and 1 are attached to keywords "wine", "wine", "bread", "cheese", "bread", "baguette", "bread", and "bread", respectively, having orders of appearances of 3 to 10, respectively.

After weights are attached to keywords in this way, weights for the same word are totalized. Points for each keyword are found (step S14).

In the example of FIG. 7, as shown in the third part as viewed from the top of FIG. 7, the weights given to the keywords "wine" and "bread" each appearing plural times are totalized for each individual word. The points for the keywords "wine" and "bread" are found to be 25 (=10+8+7) and 13 (=6+4+2+1), respectively. With respect to the keywords "California", "cheese", and "baguette" each appearing only once, the weights given to the keywords, respectively, are set equal to the points (9, 5, 3) for the keywords, respectively.

After the points for the keywords are found in this way, keywords resulting in top three points, for example, are selected as keywords in which the user is strongly interested (step S15). Based on the selected keywords, a content recommended to the user is determined (step S16).

In this way, the processing for determining a content is carried out. A content recommended to the user is determined.

That is, in the example of FIG. 7, a greater weight is attached to a keyword located closer to the head position of an extracted text within this text. Therefore, higher points can be given to the keyword "wine" appearing in the head position of an extracted text than the keyword "bread" appearing in a latter half portion of the extracted text. As a result, a content recommended to the user can be determined, based on keywords associated with items in which the user seems to be more interested. Consequently, the content associated with the items in which the user is more interested can be recommended to the user.

Figure 8:
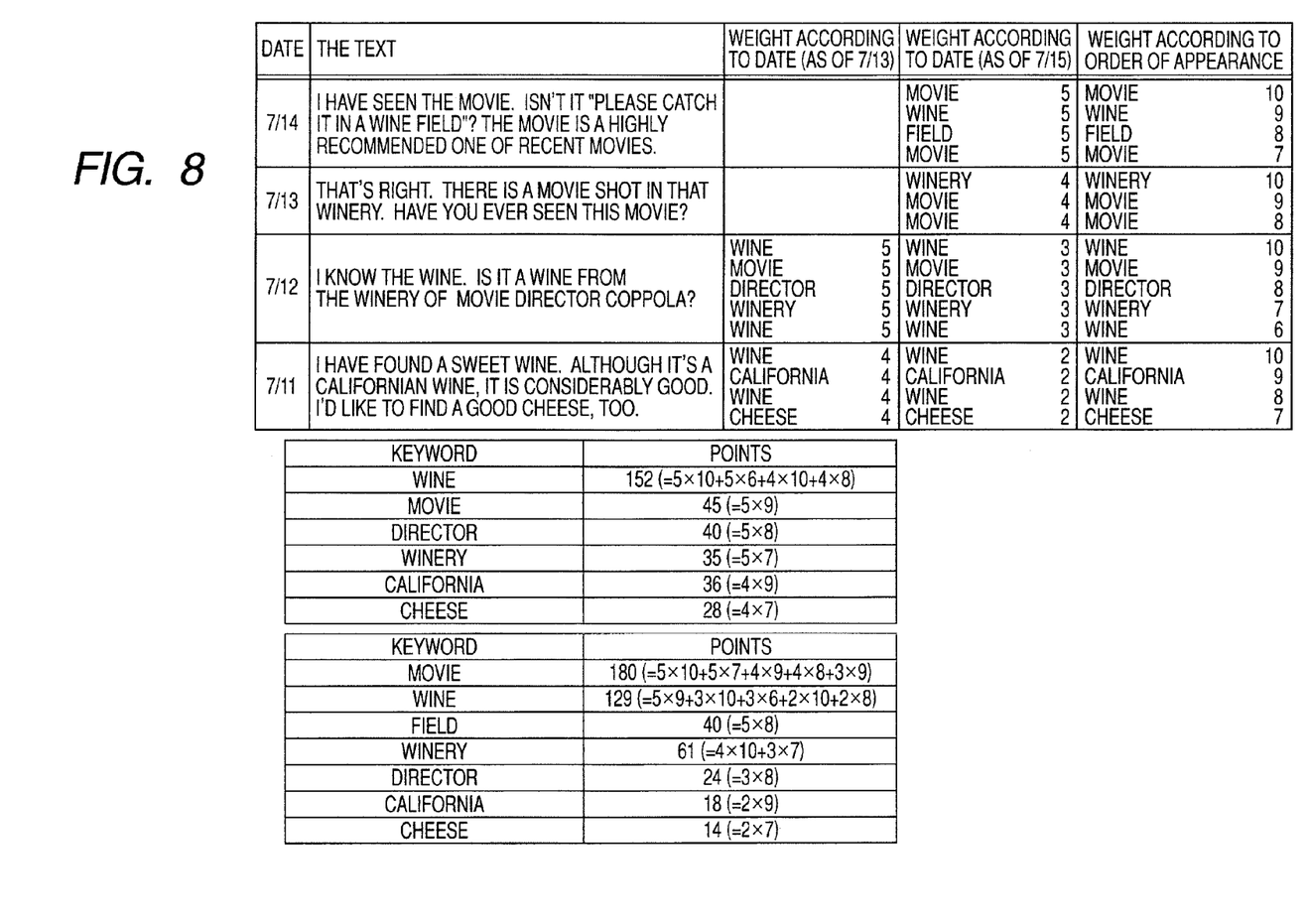
FIG. 8 shows lists illustrating specific examples of processing for determining contents.

A still other specific example of the processing for determining a content is next described by referring to the example of FIG. 8.

In the examples of FIGS. 4 and 5, the dates of messages, i.e., the dates of extracted texts, are used as keyword information. In the example of FIG. 6, the number of appearances of each keyword in one extracted text is used as keyword information. In the example of FIG. 7, the positions of keywords in an extracted text are used as keyword information. Based on the keyword information, weights are attached to the keywords. These plural examples can be combined variously.

FIG. 8 shows an example in which the example of FIGS. 4 and 5 and the example of FIG. 7 are combined. That is, in the example of FIG. 8, the date of an extracted text (the example of FIGS. 4 and 5) and positions in the extracted text (in the example of FIG. 7) are used as keyword information. Based on these sets of information, weights are given to keywords.

First, as shown at the top of FIG. 8, texts of the bodies of messages "I have seen the movie. Isn't it "Please catch it in a wine field"? The movie is a highly recommended one of recent movies", "That's right. There is a movie shot in that winery. Have you ever seen this movie?", "I know the wine. Is it a wine from the winery of movie director Coppola?", and "I have found a sweet wine. Although it's a Californian wine, it is considerably good. I'd like to find a good cheese, too." are derived as extracted texts. The date of the messages is attached to the extracted text (step S11).

Then, as shown at the top of FIG. 8, "movie", "wine", "field", and "movie" are extracted as keywords from the extracted text "I have seen the movie. Isn't it "Please catch it in a wine field"? The movie is a highly recommended one of recent movies." "Winery", "movie", and "movie" are extracted as keywords from the extracted text "That's right. There is a movie shot in that winery. Have you ever seen this movie?" "Wine", "movie", "director", "winery", and "wine" are extracted as keywords from the extracted text "I know the wine. Is it a wine from the winery of movie director Coppola?" "Wine", "California", "wine", and "cheese" are extracted as keywords from the extracted text "I have found a sweet wine. Although it's a Californian wine, it is considerably good. I'd like to find a good cheese, too." (step S12).

Then, as shown at the top of FIG. 8, the dates 7/14, 7/14, 7/14, 7/14, 7/13, 7/13, 7/13, 7/12, 7/12, 7/12, 7/12, 7/12, 7/11, 7/11, 7/11 and 7/11 of the extracted texts from which the keywords "movie", "wine", "field", "movie", "winery", "movie", "movie", "wine", "movie", "director", "winery", "wine", "wine", "California", "wine", and "cheese" have been extracted and the orders of appearances 1, 2, 3, 4, 1, 2, 3, 1, 2, 3, 4, 5, 1, 2, 3, 4 in the extracted texts are acquired as keyword information (step S13).

Higher weights are attached to keywords in extracted texts having dates closer to the present instant of time, for example. Higher weights are attached to keywords appearing in the extracted texts in earlier orders.

In the example of FIG. 8, the weight given to keywords extracted from the latest message is set to 5, in the same way as in the example of FIGS. 4 and 5. Weights are attached such that the weight is decremented as the date of a message becomes older. Then, in the same way as the case of the example of FIG. 7, the weight given to the keyword appearing earliest (in the smallest order) in each extracted text is set to 10. Weights are attached according to order of appearance such that the weight is decremented with increasing the order of appearance. With respect to each keyword, a weight according to a date and a weight according to the order of appearance are multiplied. The resulting product is given as a final weight for the keyword.

For example, if the present date is 7/13 and the bodies of messages having dates from 7/11 to 7/12 are used as extracted texts, weights relying on the dates of the keywords "wine", "movie", "director", "winery", "wine", "wine", "California", "wine", and "cheese" extracted from the extracted texts as shown at the top of FIG. 8 are set to 5, 5, 5, 5, 5, 4, 4, 4, and 4, respectively. Weights according to orders of appearances are set to 10, 9, 8, 7, 6, 10, 9, 8, and 7, respectively.

The weights according to the dates of the keywords "wine", "movie", "director", "winery", "wine", "wine", "California", "wine", and "cheese" and the weights according to the orders of appearances are multiplied. As a result, the weights of the keywords are set to 50 (=5×10), 45 (=5×9), 40 (=5×8), 35 (=5×7), 30 (=5×6), 40 (=4×10), 36 (=4×9), 32 (=4×8), and 28 (=4×7), respectively.

Another example is now given. If the present date is 7/15 and the bodies of messages having dates from 7/11 to 7/14 are used as extracted texts, weights according to the dates of the keywords "movie", "wine", "field", "movie", "winery", "movie", "movie", "wine", "movie", "director", "winery", "wine", "wine", "California", "wine", and "cheese" extracted from the extracted texts are set to 5, 5, 5, 5, 4, 4, 4, 3, 3, 3, 3, 3, 2, 2, 2, and 2, respectively, as shown at the top of FIG. 8. Weights according to the orders of appearances are set to 10, 9, 8, 7, 10, 9, 8, 10, 9, 8, 7, 6, 10, 9, 8, and 7, respectively.

The weights given to the keywords "movie", "wine", "field", "movie", "winery", "movie", "movie", "wine", "movie", "director", "winery", "wine", "wine", "California", "wine", and "cheese" are calculated to be 50 (=5×10), 45 (=5×9), 40 (=5×8), 35 (=5×7), 40 (=4×10), 36 (=4×9), 32 (=4×8), 30 (=3×10), 27 (=3×9), 24 (=3×8), 21 (=3×7), 18 (=3×6), 20 (=2×10), 18 (=2×9), 16 (=2×8) and 14 (=2×7), respectively.

After weights are attached to keywords in this way, the weights are totalized for each individual word. Points for each keyword are found (step S14).

In the example of FIG. 8, if the aforementioned present date is 7/13, for example, points for the keywords "wine", "movie", "director", "winery", "California", and "cheese" are calculated to be 152 (=5×10+5×6+4×10+4×8), 45 (=5×9), 40 (=5×8), 35 (=5×7), 36 (=4×9), and 28 (=4×7), respectively, as shown in the second part as viewed from the top of FIG. 8.

As a further example, if the above-described present date is 7/15, for example, the points for the keywords "movie", "wine", "field", "winery", "director", "California", and "cheese" are calculated to be 180 (=5×10+5×7+4×9+4×8+3×9), 129 (=5×9+3×10+3×6+2×10+2×8), 40 (=5×8), 61 (=4×10+3×7), 24 (=3×8), 18 (=2×9), and 14 (=2×7), respectively, as shown in the third portion as viewed from the top FIG. 8.

After the points for the keywords are found in this way, the keywords resulting in top three points, for example, are selected as keywords in which the user is strongly interested (step S15). Based on the selected keywords, a content recommended to the user is determined (step S16).

In this way, the processing for determining a content is performed. The content recommended to the user is determined.

That is, in the example of FIG. 8, higher weights are attached either to keywords having dates closer in time to the present instant of time or to keywords closer to the head position of an extracted text. Therefore, during two days from 7/11 to 7/12 in which wine is the central topic, for example, the points for the keyword "wine" can be made highest. During four days from 7/11 to 7/14 in which the central topic is shifting from wine to movie, the points for the keyword "movie" can be made highest. As a result, a content recommended to the user can be determined, based on keywords associated with items in which the user seems to be more interested. The content associated with the items in which the user is more interested can be recommended to the user.

In the description provided so far, the titles of messages (FIG. 4) or their bodies (FIGS. 5-8) are used as extracted texts. Alternatively, each message may be made up of items "title", "comment", and "memo", which may be hereinafter referred to as text items. These text items are all used as extracted texts. The weight given to each keyword may be varied according to the kind of a text item used as keyword information on the assumption that the kind of the text item is keyword information.

For instance, it is also considered that the keyword described in the text item "title" is important. Therefore, the text item "title" can be regarded as a text item kind in which the user is strongly interested. If no limitations are imposed on the number of words or the number of characters in the text item "comment", more detailed description can be provided. Therefore, the text item "comment" can be regarded as a text item kind in which the user is strongly interested. Accordingly, a higher weight can be attached to a keyword extracted from a text item kind in which the user seems to be strongly interested.

In the description provided so far, each extracted text is taken as a text associated with a message. The extracted texts may also be broadcast contents (such as broadcast programs and program information), network contents (such as image data and audio data at Web sites), or texts created by the user and attached to image data or audio data possessed by the user of the information processor 1 (such as a comment of the user on the content or memo).

Figure 9:
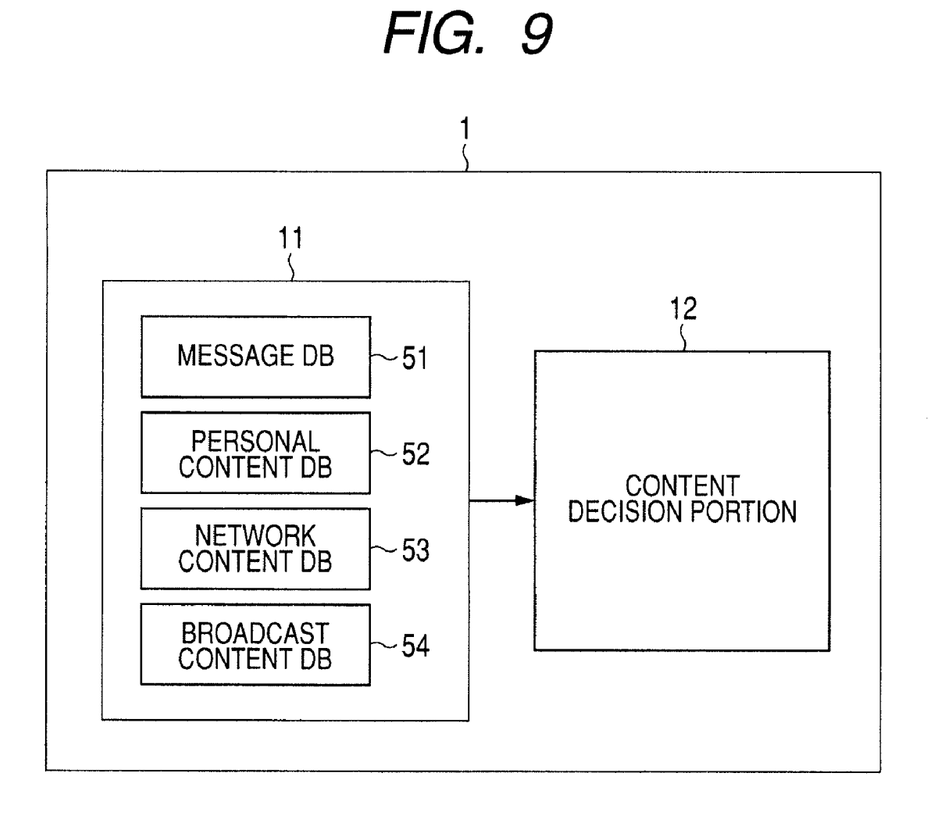
FIG. 9 is a block diagram showing a further example of configuration of the information processor according to one embodiment of the invention.

In the information processor 1 treating such extracted texts, a personal content DB (database) 52, a network content DB 53, and a broadcast content DB 54 are formed in the text storage portion 11 as well as a message DB 51 in which messages are stored, as shown in FIG. 9. Personal contents are stored in the personal content DB 52. Network contents are stored in the network content DB 53. Broadcast contents are stored in the broadcast content DB 54. Text information containing texts created by the user as mentioned previously is interrelated to contents and stored in the databases.

Personal contents stored in the personal content DB 52 are obtained from a memory card (not shown), for example, detachably connected with the information processor 1 and stored. Network contents stored in the network content DB 53 are obtained, for example, from a website server (not shown) via the Internet and stored. Broadcast contents stored in the broadcast content DB 54 are obtained, for example, from a server (not shown) in a broadcast station via the Internet or airwaves.

Kinds of contents are classified into two major categories: (1) contents created or managed by the user, i.e., the user has the copyright of them; and (2) contents of which the user has no copyright. It is considered that the user is strongly interested in contents of which the user has the copyright or the user is to analyze those contents in which the user is interested. That is, it can also be considered that the user is more interested in keywords extracted from extracted texts, for example, attached to personal contents (such as contents stored in the personal content DB 52) of which the user has the copyright, and that the user is less interested in keywords extracted from extracted texts (such as contents stored in the network content DB 53 and in the broadcast content DB 54) of which the user has no copyright, the texts being attached, for example, to broadcast contents and network contents.

Accordingly, the kinds of contents to which extracted texts are related may be derived as keyword information, it being noted that keywords are extracted from the extracted texts. A higher weight may be attached to keywords of kinds of contents in which the user is interested.

As described so far, the information processor 1 extracts keywords from a text created by a user, acquires given keyword information about the extracted keywords, finds points indicating the degrees of interest of the user in the keywords, based on the keyword information, selects given keywords from the extracted keywords based on the points, and determines a content recommended to the user based on the selected keywords. That is, the content recommended to the user is determined based on the text created by the user. Consequently, the range of contents recommended to the user can be determined within the intents of the user.

The keyword information is not limited to the above-described kinds of information. The number of extracted texts containing keywords and periods of time in which keywords appear in the extracted texts may also be used as the keyword information.

Each content composed of an extracted text is not limited to messages. It may also be text contained in weblogs.

Contents attached to extracted texts are not limited to broadcast contents, network contents, and personal contents.

The aforementioned sequence of processing steps can be carried out either by hardware or by software. Where the sequence of processing steps are performed by software, a program constituting the software is installed from a recording medium into a computer in which dedicated hardware is incorporated or into a general-purpose personal computer capable of executing various functions by installing various programs.

Figure 10:
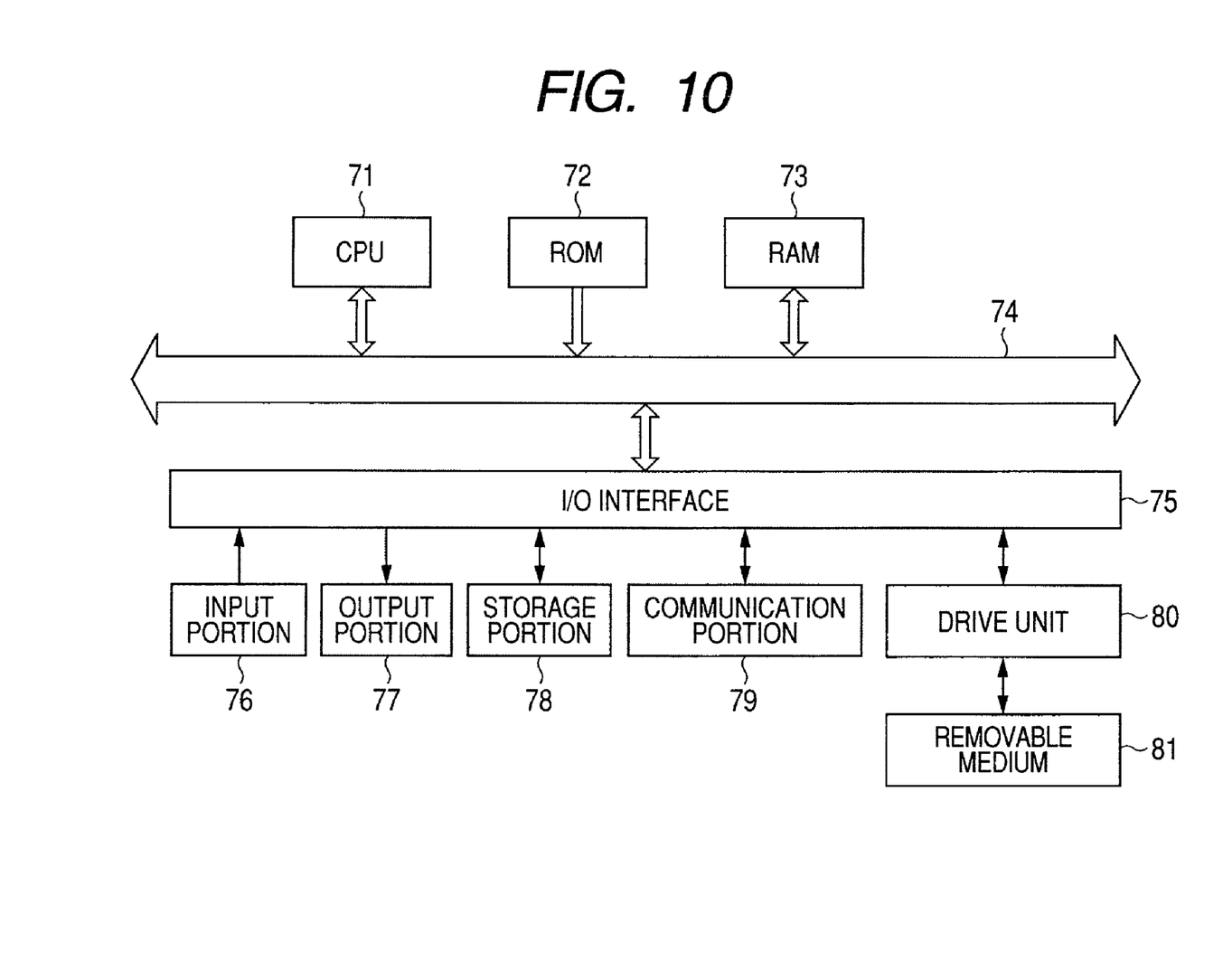
FIG. 10 is a block diagram showing an example of configuration of hardware of a computer according to one embodiment of the invention.

FIG. 10 is a block diagram showing an example of configuration of hardware of a computer for executing the aforementioned sequence of processing steps by a program.

In the computer, a CPU (central processing unit) 71, a ROM (read only memory) 72, and a RAM (random access memory) 73 are interconnected by a bus 74.

Furthermore, an input/output interface 75 is connected with the bus 74. An input portion 76, an output portion 77, a storage portion 78, a communication portion 79, and a drive unit 80 for driving a removable medium 81 such as a magnetic disk, optical disk, magnetooptic disk, or semiconductor memory are connected with the input/output interface 75. The input portion 76 includes a keyboard, a computer mouse, and a microphone. The output portion 77 includes a display device and loudspeakers. The storage portion 78 is made of a hard disk or nonvolatile memory.

In the computer constructed as described so far, the CPU 71 loads the program stored, for example, in the storage portion 78 into the RAM 73 via both input/output interface 75 and bus 74 and executes the program, thus performing the above-described sequence of processing steps.

The program executed by the CPU 71 of the computer is offered either by recording the program onto the removable medium 81 that is a packaged medium made of a magnetic disk (including a flexible disk), optical disk (such as a CD-ROM (compact disk read-only memory) or DVD (digital versatile disc)), magnetooptic disk, or semiconductor memory or via a cabled or wireless transmission medium such as a local area network, the Internet, or digital satellite broadcasting.

The program can be installed into the storage portion 78 via the input/output interface 75 by mounting the removable medium 81 into the drive unit 80. The program can be received by means of the communication portion 79 via cabled or wireless transmission media, and can be installed into the storage portion 78. Alternatively, the program can be previously installed in the ROM 72 or in the storage portion 78.

The program executed by the computer may be a program which
performs processing steps in a time-sequential manner in the order described herein. Furthermore, the program may perform the processing steps in parallel or typically at required timings as when a call is made.

It is to be understood that the present invention is not limited to the above-described embodiments. Rather, various changes and modifications are possible without departing from the gist of the present invention.

What is claimed is:

1. An information processor comprising:
 a keyword extraction portion for extracting keywords from a text created by a user;
 a keyword information acquisition portion for acquiring keyword information about the keywords extracted by the keyword extraction portion;

an interest degree calculation portion for finding information about degrees of interest indicating user's degrees of interest in the keywords, based on the keyword information;

a keyword selection portion for selecting interest keywords from the keywords extracted by the keyword extraction portion, based on the information about the degrees of interest; and a content decision portion for determining a content recommended to the user, based on the interest keywords selected by the keyword selection portion, wherein the interest degree calculation portion assigns a higher degree of interest to keywords extracted from a first text than keywords extracted from a second text, wherein the user has a copyright on a content comprising the first text, and wherein the user has no copyright on a content comprising the second text, wherein the keyword information includes information indicating an instant of time corresponding to an instant of time at which the text from which the keywords are extracted was created, wherein a weight is attached to a keyword extracted from a the text corresponding to the time at which the text was created, and wherein a higher weight is attached to a keyword extracted from the text created at an instant of time closer in time to the present instant of time.

2. An information processor as set forth in claim 1, wherein the keyword information further includes:

information indicating positions of the keywords in the text, and information indicating the number of appearances of the keywords in the text.

3. An information processor as set forth in claim 1, wherein the text is associated with the content, and wherein the keyword information is information indicating a kind of the content to which the text is related.

4. An information processor as set forth in claim 3, wherein the content is a broadcast content, a network content, or a personal content.

5. An information processor as set forth in claim 1,
wherein the text includes plural items,
wherein the information processor further comprises a text acquisition portion for acquiring a text of an item of the plural items,
wherein the keyword extraction portion extracts keywords from the text of the item, and
wherein the keyword information acquisition portion acquires information indicating a kind of the item having the keywords extracted by the keyword extraction portion as the keyword information.

6. A method of information processing, comprising the steps of:

extracting keywords from a text created by a user;
acquiring keyword information about the keywords extracted by processing of the extracting step;
finding interest degree information indicating degrees of interest of the user in the keywords, based on the keyword information;

selecting interest keywords from the keywords extracted by processing of the extracting step, based on the interest degree information; and determining a content recommended to the user, based on the interest keywords selected by processing of the selecting step, wherein the finding step assigns a higher degree of interest to keywords extracted from a first text than keywords extracted from a second text, wherein the user has a copyright on a content comprising the first text, and wherein the user has no copyright on a content comprising the second text, wherein the keyword information includes information indicating an instant of time corresponding to an instant of time at which the text from which the keywords are extracted was created, wherein a higher weight is attached to a keyword extracted from the text corresponding to the time at which the text was created, and wherein a higher weight is attached to a keyword extracted from the text created at an instant of time closer in time to the present instant of time.

7. A non-transitory storing medium storing a program for causing a computer to perform information processing, the program including the steps of:

extracting keywords from a text created by a user;
acquiring keyword information about the keywords extracted by processing of the extracting step;
finding interest degree information indicating degrees of interest of the user in the keywords, based on the keyword information;
selecting interest keywords from the keywords extracted by processing of the extracting step, based on the interest degree information; and
determining a content recommended to the user, based on the interest keywords selected by processing of the selecting step,
wherein the finding step assigns a higher degree of interest to keywords extracted from a first text than keywords extracted from a second text,
wherein the user has a copyright on a content comprising the first text, and
wherein the user has no copyright on a content comprising the second text,
wherein the keyword information includes information indicating an instant of time corresponding to an instant of time at which the text from which the keywords are extracted was created,
wherein a higher weight is attached to a keyword extracted from the text corresponding to the time at which the text was created, and
wherein a higher weight is attached to a keyword extracted from the text created at an instant of time closer in time to the present instant of time.

* * * * *